US011700136B2

(12) United States Patent
Qureshi et al.

(10) Patent No.: US 11,700,136 B2
(45) Date of Patent: Jul. 11, 2023

(54) PUF-IPA: A PUF-BASED IDENTITY PRESERVING LIGHTWEIGHT AUTHENTICATION PROTOCOL USING BINARY STRING SHUFFLING

(71) Applicant: Kansas State University Research Foundation, Manhattan, KS (US)

(72) Inventors: Mahmood Azhar Qureshi, Manhattan, KS (US); Arslan Munir, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 230 days.

(21) Appl. No.: 17/296,863

(22) PCT Filed: Nov. 21, 2019

(86) PCT No.: PCT/US2019/062582
§ 371 (c)(1),
(2) Date: May 25, 2021

(87) PCT Pub. No.: WO2020/112484
PCT Pub. Date: Jun. 4, 2020

(65) Prior Publication Data
US 2022/0029836 A1 Jan. 27, 2022

Related U.S. Application Data

(60) Provisional application No. 62/805,504, filed on Feb. 14, 2019, provisional application No. 62/771,373, filed on Nov. 26, 2018.

(51) Int. Cl.
*H04L 9/32* (2006.01)
*H04L 9/06* (2006.01)

(52) U.S. Cl.
CPC .......... *H04L 9/3278* (2013.01); *H04L 9/0662* (2013.01)

(58) Field of Classification Search
CPC .......................... H04L 9/0662; H04L 9/3278
See application file for complete search history.

(56) References Cited

U.S. PATENT DOCUMENTS

| 5,473,689 | A | * | 12/1995 | Eberhard | ............. | G06Q 20/341 |
| | | | | | | 713/172 |
| 7,818,569 | B2 | * | 10/2010 | Devadas | ................. | G06F 21/79 |
| | | | | | | 713/168 |

(Continued)

OTHER PUBLICATIONS

International Search Report and Written Opinion in corresponding PCT/US2019/062582, dated Jan. 31, 2020.

*Primary Examiner* — Gary S Gracia
(74) *Attorney, Agent, or Firm* — Hovey Williams LLP

(57) ABSTRACT

A computer-implemented method for authentication of a queried device having an electrical circuit exhibiting physically unclonable functions (PUFs). The method includes: at the queried device, generating a first random number based on an initial first counter value; matching the first random number against a first value of a record stored in a database of a querying device, the record including second (shuffled) and third values; at the queried device, generating a second random number based on a once incremented first counter value, deterministically generating a de-shuffled second value based on an initial second counter value, determining that the second random number matches the de-shuffled second value, and submitting sub-challenges corresponding to the second random number to the electrical circuit to generate a response; and, at the querying device, determining that the response matches the third value of the record to complete a first authentication of the queried device.

20 Claims, 6 Drawing Sheets

(56) References Cited

U.S. PATENT DOCUMENTS

| | | | | |
|---|---|---|---|---|
| 8,694,778 B2* | 4/2014 | Teuwen | | H04L 9/3278 |
| | | | | 713/168 |
| 9,311,403 B1* | 4/2016 | Ioffe | | G06F 16/951 |
| 9,692,784 B1* | 6/2017 | Nenov | | H04L 63/1458 |
| 9,781,603 B1* | 10/2017 | Nenov | | G08B 13/08 |
| 9,819,699 B1* | 11/2017 | Nenov | | H04L 67/60 |
| 10,154,061 B1* | 12/2018 | Schetina | | H04L 63/0471 |
| 10,355,853 B1* | 7/2019 | Surmi | | G06F 21/575 |
| 10,476,663 B1* | 11/2019 | Lazier | | G06F 21/602 |
| 10,502,572 B1* | 12/2019 | Surmi | | H04L 63/1433 |
| 10,554,405 B1* | 2/2020 | Endress | | H04L 9/0643 |
| 10,608,813 B1* | 3/2020 | Lazier | | G06F 21/602 |
| 11,108,637 B1* | 8/2021 | Paczkowski | | H04W 76/11 |
| 11,140,220 B1* | 10/2021 | Coleman | | H04L 67/1031 |
| 11,145,017 B1* | 10/2021 | Wu | | G06F 16/137 |
| 11,277,272 B2* | 3/2022 | Choi | | H04L 9/3278 |
| 11,356,254 B1* | 6/2022 | Lazier | | H04L 9/0656 |
| 11,403,432 B2* | 8/2022 | Karpinskyy | | G06F 21/566 |
| 2013/0051552 A1* | 2/2013 | Handschuh | | H04L 9/0897 |
| | | | | 380/44 |
| 2013/0152195 A1* | 6/2013 | Nandha Premnath | | |
| | | | | G06F 21/606 |
| | | | | 726/22 |
| 2014/0331044 A1* | 11/2014 | Fujii | | G06F 16/24 |
| | | | | 713/165 |
| 2018/0227905 A1* | 8/2018 | Zhou | | H04W 72/23 |
| 2018/0248686 A1* | 8/2018 | Alakuijala | | H04L 9/0643 |
| 2018/0351752 A1* | 12/2018 | Wallrabenstein | | H04L 9/002 |
| 2019/0188157 A1* | 6/2019 | Shamsaasef | | G06F 9/544 |
| 2019/0213836 A1* | 7/2019 | Lieberman | | G07F 17/3211 |
| 2019/0223129 A1* | 7/2019 | Starsinic | | H04L 63/0807 |
| 2019/0251787 A1* | 8/2019 | Cire | | G07F 17/3244 |
| 2019/0251788 A1* | 8/2019 | Cire | | G07F 17/3288 |
| 2019/0319790 A1* | 10/2019 | Fenner | | H04L 9/3242 |
| 2020/0111320 A1* | 4/2020 | Toth | | G07F 17/3204 |
| 2020/0111321 A1* | 4/2020 | Duran | | G07F 17/3267 |
| 2020/0118391 A1* | 4/2020 | Cire | | G07F 17/3288 |
| 2020/0143636 A1* | 5/2020 | Cire | | G07F 17/3262 |
| 2020/0212867 A1* | 7/2020 | Lee | | H04W 4/70 |
| 2020/0322420 A1* | 10/2020 | Sen | | G06Q 20/02 |
| 2020/0372757 A1* | 11/2020 | Cire | | G07F 17/3223 |
| 2020/0394871 A1* | 12/2020 | Arnone | | G07F 17/3223 |
| 2021/0068042 A1* | 3/2021 | Sherman | | H04W 48/16 |
| 2021/0097106 A1* | 4/2021 | Akar | | G06F 16/2255 |
| 2021/0126790 A1* | 4/2021 | Li | | H04L 9/3218 |
| 2021/0173066 A1* | 6/2021 | Yoon | | H04B 1/719 |
| 2021/0174642 A1* | 6/2021 | Toth | | G07F 17/3213 |
| 2021/0281432 A1* | 9/2021 | Cambou | | H04L 9/0643 |
| 2021/0286595 A1* | 9/2021 | Huang | | G06F 7/582 |
| 2022/0007350 A1* | 1/2022 | Wang | | H04W 72/542 |
| 2022/0012092 A1* | 1/2022 | Rieger | | G06F 21/72 |
| 2023/0020947 A1* | 1/2023 | Luo | | H04L 9/3278 |

* cited by examiner

PUF-IPA: A PUF-BASED IDENTITY PRESERVING LIGHTWEIGHT AUTHENTICATION PROTOCOL USING BINARY STRING SHUFFLING

CROSS-REFERENCE TO RELATED APPLICATIONS

The present application is the U.S. National Stage of International Patent Application No. PCT/US2019/062582, filed Nov. 21, 2019, which claims the benefit of and priority from the following identically-titled U.S. Provisional Patent Applications: Ser. No. 62/771,373, filed Nov. 26, 2018; and Ser. No. 62/805,504, filed Feb. 14, 2019, entitled PUF-IPA: A PUF-BASED IDENTITY PRESERVING LIGHTWEIGHT AUTHENTICATION PROTOCOL USING BINARY STRING SHUFFLING, each of which is incorporated by reference in its entirety herein.

FIELD OF THE INVENTION

The present disclosure generally relates to computer-implemented methods, systems comprising computer-readable media, and electronic devices for authenticating a queried device. More particularly, the present disclosure generally relates to electronic devices for authenticating a queried device exhibiting physically unclonable functions (PUFs).

BACKGROUND

Existing authentication technologies may provoke a response from a device that reveals the device's physically unclonable functions (PUFs) in order to authenticate that device. The PUFs derive directly from the physically unclonable microstructure of the device as randomly introduced through manufacturing variations (e.g., metal resistivity and effective channel lengths of transistors), and act as a digital fingerprint for the device. For example, a silicon PUF may be based on hidden timing and delay information of integrated circuits, with a corresponding delay circuit including multiplexers and an arbiter for computing an output based on relative delay difference between two paths in the integrated circuit with the same layout length. For another example, a silicon PUF may be based on delay loops (ring oscillators) and counters.

However, current authentication technologies utilizing PUFs are vulnerable to modeling attacks in which multiple challenge-response pairs are exposed to the attacker and machine learning, linear programming and/or algebraic methods are used to model the device's PUFs. Moreover, such current technologies often require storage of sensitive information regarding how the queried device behaves in connection with authentication queries, increasing the risk that an attacker will be able to "hack" the authentication process. For instance, an enrollment process may include a large number of randomly chosen challenges posed to a queried device, with the responses being stored in a purportedly secure database. Thereafter, verification may be performed as needed by a querying device reusing each of the large number of random challenges a single time and confirming that each corresponding response matches the expected response stored in the database. Storage of challenges and responses in such a way may enhance the risk of breach.

Embodiments of the present invention provide an improved systems, devices and methods for device authentication. This background discussion is intended to provide information related to the present invention which is not necessarily prior art.

BRIEF SUMMARY

Embodiments of the present technology relate to improved computer-implemented methods, systems comprising computer-readable media, and electronic devices for authenticating an electronic device exhibiting physically unclonable functions (PUFs).

In a first aspect, a system for device authentication enrollment may be provided. The system may include a queried electronic device having a queried memory element and an electrical circuit configured to output electrical signals indicative of a physically unclonable function of the queried electronic device. The system may also include non-transitory computer-readable media having computer-readable instructions instructing completion of the following steps by at least one processing element: increment a first counter according to a first set of increments to generate a set of first counter values including an initial first counter value, the set of first counter values being in a sequential order; generate a set of random numbers at least in part by performing a hashing operation on each of the set of first counter values, whereby the set of random numbers is ordered to preserve the sequential order; logically pair off the set of random numbers to generate a plurality of pairs, each of the pairs including first-indexed and second-indexed ones of the set of random numbers; store the first-indexed ones of the set of random numbers in a database; submit sub-challenges respectively corresponding to the second-indexed ones of the set of random numbers to the electrical circuit to generate a set of responses; perform, using second counter values as inputs, deterministic shuffling operations respectively on the second-indexed ones of the set of random numbers to generate a set of shuffled second-indexed ones of the set of random numbers; store the set of shuffled second-indexed ones of the set of random numbers in the database, the set of shuffled second-indexed ones of the set of random numbers being stored respectively in relation to corresponding first-indexed ones of the set of random numbers to preserve the logical pairing of the pairs; store each of the responses in the database so as to form a group or record with a corresponding first-indexed one of the set of random numbers and a corresponding shuffled second-indexed one of the set of random numbers; and store the initial first counter value and the initial second counter value in the queried memory element. The computer-readable instructions stored on the non-transitory computer-readable media may instruct the at least one processing element to perform additional, fewer, or alternative actions, including those discussed elsewhere herein.

In another aspect, a computer-implemented method may be provided for authentication of a queried device having a queried memory element, a queried processing element, a queried communication element, and an electrical circuit configured to output electrical signals indicative of a physically unclonable function of the queried device. The computer-implemented method may include: retrieving, via the queried processing element, a first counter value from the queried memory element; generating, via the queried processing element, a first random number based on the first counter value at least in part by performing a hashing operation on the first counter value; transmitting, via the queried communication element, the first random number to a querying device, the querying device having a querying communication element, a querying memory element and a querying processing element; matching, via the querying processing element, the first random number against a first value of a record, the record being stored in a database of the querying memory element and also corresponding to second and third values; transmitting, via the querying communication element and the queried communication element, the second value corresponding to the record to the queried device; incrementing, via the queried processing element, the first counter value according to a first increment to generate a once incremented first counter value; generating, via the queried processing element, a second random number at least in part by performing a hashing operation on the once incremented first value; retrieving, via the queried processing element, a second value from the queried memory element; performing, via the queried processing element and based on the second value, a deterministic de-shuffling operation on the second value of the record received from the querying device to generate a de-shuffled second value of the record; determining, via the queried processing element, that the second random number generated by the queried device matches the de-shuffled second value of the record; submitting, based on the matching determination and via the queried processing element, sub-challenges corresponding to the second random number to the electrical circuit to generate a response; transmitting, via the querying communication element and the queried communication element, the response to the querying device; and determining, via the querying processing element, that the response generated by the queried device matches the third value of the record to complete a first authentication of the queried device. The method may include additional, less, or alternate actions, including those discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1:
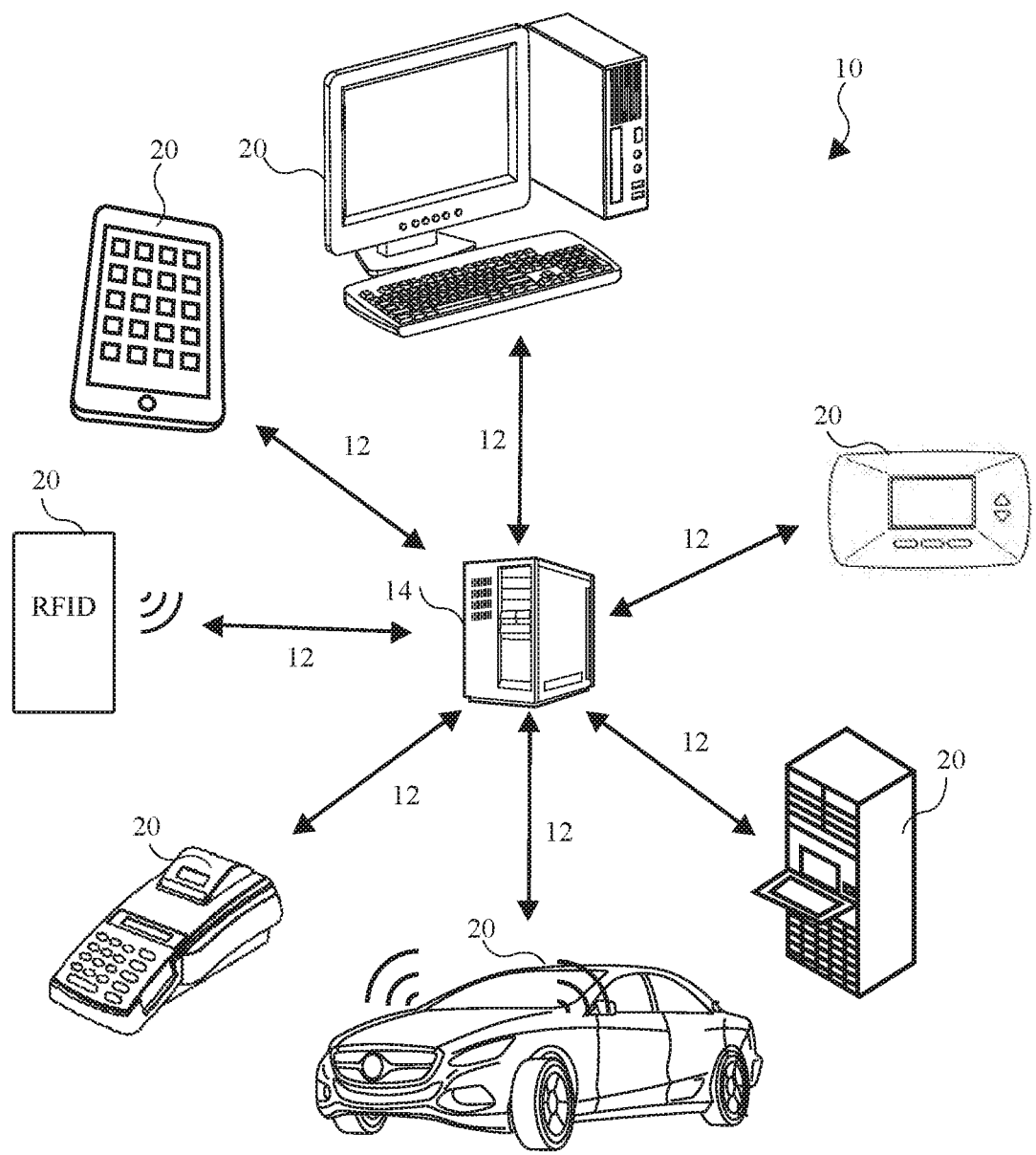
FIG. 1 illustrates various components of an exemplary system for authenticating an electronic device exhibiting physically unclonable functions (PUFs) according to embodiments of the present invention in schematic form.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

As outlined above, modern systems for authenticating a device based on such device's physically unclonable functions (PUFs) are susceptible to modeling and/or hacking attacks, at least because of the way(s) in which challenge-response pairs are stored and/or communicated between devices involved in the authentication process. Embodiments of the present invention provide stronger resilience against security attacks, particularly where the adversary can not only conduct passive or active attacks during an authentication phase, but may also breach a querying device that stores PUF information about a queried device. Further, the preferred embodiment provides such enhanced resilience via a method that may be implemented in a low-resource computational architecture, permitting widespread use across a variety of queried devices.

In an embodiment of the present invention described in more detail below, relationships between challenges and responses, and the challenges/responses themselves, are obscured and transformed to reduce or eliminate their value to an attacker that might breach a database of the querying device. For example, mere unauthorized access to the database of the querying device and to enrollment data needed for authenticating a queried device is insufficient to successfully model the queried device, at least in part because, in a preferred embodiment, missing but necessary information (e.g., counter values) can only be supplied by the queried device itself. For another example, values used to derive challenges may themselves only be passed between queried and querying device during authentication in a shuffled or otherwise obscured format, making matching of challenges and responses difficult.

In addition, a robust control logic is exerted over access to a PUF circuit of the queried device, requiring a correct input message be applied for access to the PUF circuit. Moreover, in a preferred embodiment, attempted entry of a pre-determined number of incorrect input message(s) will automatically trigger a refusal of access to the PUF circuit by the queried device unless and until an unlocking event occurs or an unlocking code is presented. These features introduced by the control logic outlined herein reduce the need for non-linearities in the PUF circuit of the queried device which, in turn, improves accuracy over prior art systems.

Broadly speaking, an embodiment of the invention is method for authentication of a queried device having an electrical circuit exhibiting PUFs. The method comprises: at the queried device, generating a first random number based on an initial first counter value; matching the first random number against a first value of a record stored in a database of a querying device, the record including second (shuffled) and third values; at the queried device, generating a second random number based on a once incremented first counter value, deterministically generating a de-shuffled second value based on an initial second counter value, determining that the second random number matches the de-shuffled second value, and submitting sub-challenges corresponding to the second random number to the electrical circuit to generate a response; and, at the querying device, determining that the response matches the third value of the record to complete a first authentication of the queried device.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Exemplary System

FIG. 1 depicts an exemplary environment in which embodiments of a system 10 may be utilized for authenticating an electronic device exhibiting physically unclonable functions (PUFs). The environment may include communication links 12 for enabling electronic communications between components of the system 10. The system 10 may include a querying device 14 and one or more queried devices 20. The querying device 14 may manage enrollment of the queried devices 20 for authentication processes, as described in more detail below. The querying device 14 may also manage real-time authentication of queried device(s) 20 following enrollment, also as described in more detail below. One of ordinary skill will appreciate, however, that enrollment and subsequent authentication functions may be performed by different physical computing devices, though they are described herein as being performed by the same querying device 14 for ease of reference.

In a preferred embodiment, the queried devices 20 may be low-resource electronic devices (e.g., simple Internet of things (IoT) devices, radio frequency identification (RFID) tags, or the like). Consequently, the preferred embodiment presents an improved and relatively lightweight protocol that may be implemented with correspondingly lightweight computational architectures such as that outlined in FIG. 4 and discussed in more detail below. However, higher-level computational architectures and hardware of devices such as smartphones, laptop computers or the like may comprise queried devices 20, and may be authenticated using the system 10, without departing from the spirit of the present invention.

Each queried device 20 may optionally execute an authentication program 22, as described in more detail below, for managing at least some of the steps of embodiments of the present invention exemplified in FIG. 5 hereof. Likewise, the querying device 14 may execute a querying device program 26 for managing at least some of the steps for enrollment and authentication of queried devices 20 set out in FIG. 5.

Broadly, the communication links 12 may allow communication between the queried devices 20 and the querying device 14. One or more of the communication links 12 may include or comprise local area networks, metro area networks, wide area networks, cloud networks, the Internet, cellular networks, plain old telephone service (POTS) networks, and the like, or combinations thereof. The communication links 12 may be wired, wireless, or combinations thereof and may include components such as modems, gateways, switches, routers, hubs, access points, repeaters, towers, and the like. For example, the queried devices 20 may generally connect to the communication links 12 and/or to the querying device 14 wirelessly, such as radio frequency (RF) communication using wireless standards such as cellular 2G, 3G, 4G, or 5G, Institute of Electrical and Electronics Engineers (IEEE) 802.11 standards such as WiFi, IEEE 802.16 standards such as WiMAX, Bluetooth®, or combinations thereof. Also or alternatively, the queried devices 20 may generally connect to the communication links 12 and/or to the querying device 14 via Bluetooth® wireless communication protocol in general, or the Bluetooth® low energy (BLE) protocol. The queried devices 20 may also generally include electrical power sources housed in small boxes or packages for powering the components thereof outlined herein.

The querying device 14 generally retains electronic data and may respond to requests to retrieve data as well as to store data. The querying device 14 may be embodied by application servers, communication servers, database servers, file servers, gaming servers, mail servers, print servers, web servers, or the like, or combinations thereof. Furthermore, the querying device 14 may include a plurality of servers, virtual servers, or combinations thereof. The querying device 14 may be configured to include or execute software such as file storage applications, database applications, email or messaging applications, web server applications, or the like, in addition to and/or in conjunction with the querying device program 26.

The querying device 14 may apply business methods or algorithms, may utilize and/or manage lookup tables or databases, receive user input via one or more peripheral devices or associated systems, or perform other tasks. The querying device 14 may perform tasks in order to enroll and/or authenticate queried devices 20, and/or to perform other tasks outlined throughout this disclosure.

The querying device 14 may further include a communication element 30, a processing element 34, and a memory element 38.

Figure 3:
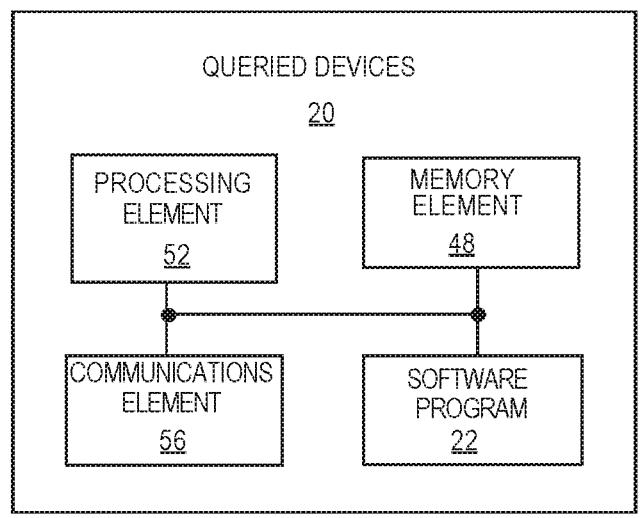

The queried devices 20 may be embodied by a radio frequency identification (RFID) tag, an access control badge or the like, a medical device, a data cloud and/or data center computer, a smart watch, a smart phone, a personal digital assistant (PDA), a tablet, a palmtop or laptop computer, a notebook, a netbook, smart glasses, wearable and non-wearable electronics (e.g., any IoT device), or other mobile device. Each queried device 20 may include a memory element 48, a processing element 52, and a communications element 56, as seen in FIG. 3. The memory element 48 may store the software program 22, and the processing element 52 may execute the software program 22.

The communication elements 30, 56 may allow communication between one another and/or with external systems or devices. The communication elements 30, 56 may include signal or data transmitting and receiving circuits, such as antennas, amplifiers, filters, mixers, oscillators, digital signal processors (DSPs), and the like. The communication elements 30, 56 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth®, or combinations thereof. Alternatively, or in addition, the communication elements 30, 56 may establish communication through connectors or couplers that receive metal conductor wires or cables which are compatible with networking technologies such as ethernet.

In certain embodiments, the communication elements 30, 56 may also couple with optical fiber cables. The communication elements 30, 56 may be in communication with or electronically coupled to memory elements 38, 48 and/or processing elements 34, 52.

The memory elements 38, 48 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory elements 38, 48 may include, or may constitute, a "computer-readable medium." The memory elements 38, 48 may store the instructions, code, code segments, software, firmware, programs, applications, apps, services, daemons, or the like that are respectively executed by the processing elements 34, 52. The memory elements 38, 48 may also store settings, data, documents, sound files, photographs, movies, images, databases, and the like. For example, the memory element 38 may store and maintain a database, and the memory element 48 may comprise non-volatile memory configured to store, among other things, counter values discussed in more detail below. (See FIG. 4)

The processing elements 34, 52 may include processors. The processing elements 34, 52 may include microprocessors, microcontrollers, DSPs, field-programmable gate arrays (FPGAs), analog and/or digital application-specific integrated circuits (ASICs), or the like. The processing elements 34, 52 may include combinations of any of the foregoing. The processing elements 34, 52 may generally execute, process, or run instructions, code, code segments, software, firmware, programs, applications, apps, processes, services, daemons, or the like. The processing elements 34, 52 may also include hardware components, such as finite-state machines, comparators, sequential and combinational logic, and other electronic circuits that may perform the functions necessary for the operation of embodiments of the current inventive concept. The processing elements 34, 52 may be in communication with the other electronic components through serial or parallel links that include address busses, data busses, control lines, and the like.

Exemplary Low-Resource Computational Architecture

Figure 4:
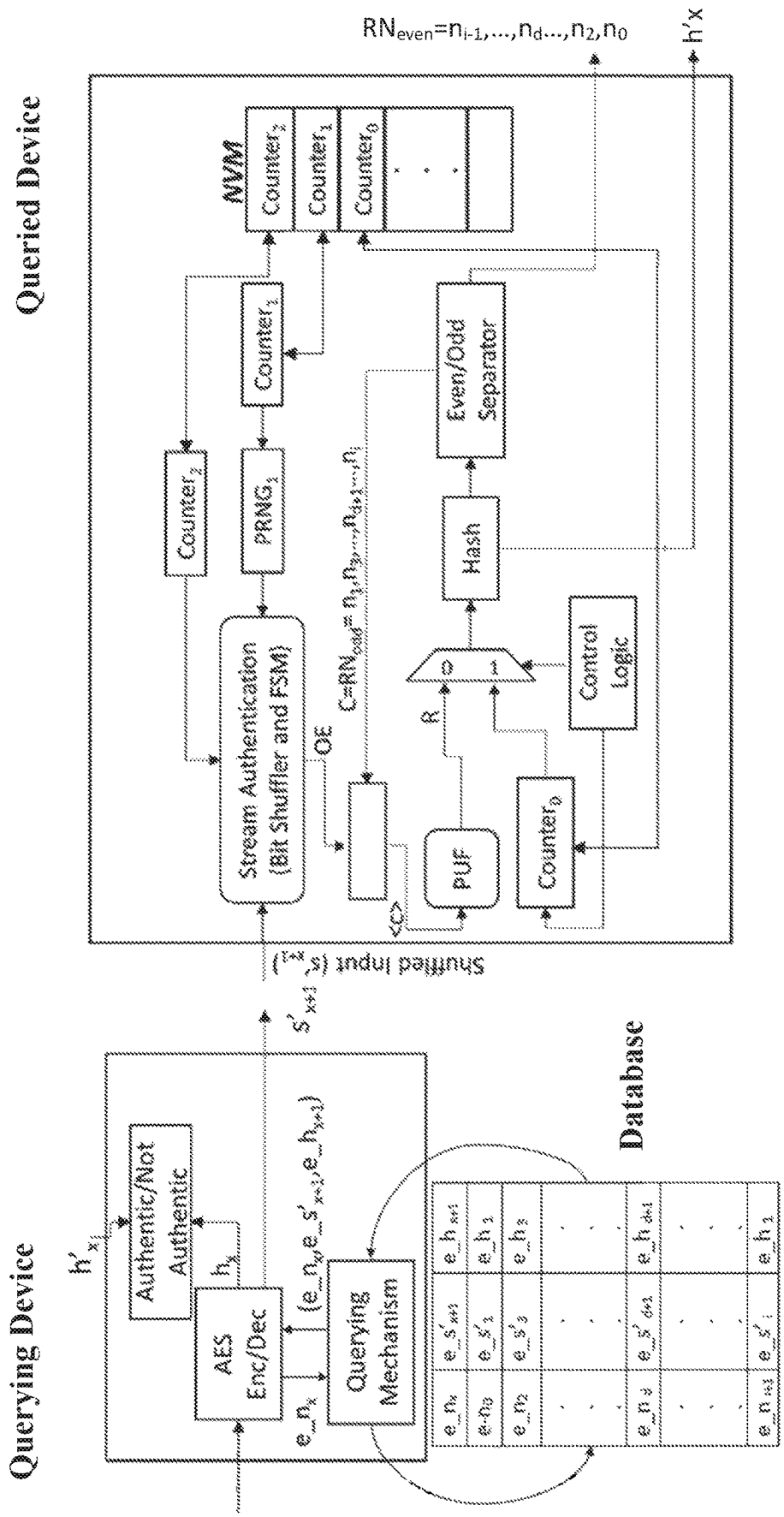
FIG. 4 is a flowchart of various logical components of an exemplary system for authenticating an electronic device exhibiting PUFs, and of relationships and information flows between the components, in accordance with embodiments of the present invention.

Turning briefly to FIG. 4, a lightweight computational architecture for implementation of a preferred embodiment of the present invention is illustrated. A querying device may be embodied by a server or other computing device configured to enroll and authenticate one or more queried devices. For instance, all or some of the illustrated functional components of the querying device may be implemented within a querying device 14 (see FIG. 1). Similarly, a queried device may be embodied by any of the electronic devices outlined hereinabove including, without limitation, by a radio frequency identification (RFID) tag, access control badge or the like, medical device, data cloud and/or data center computer. Again, all or some of the illustrated functional components of the queried device may be implemented within a queried device 20 (See FIG. 1). However, one of ordinary skill will appreciate that multiple devices may implement the illustrated functional components, and that such functional components may be distributed differently among such querying and queried device(s), without departing from the spirit of the present invention.

Turning now to the illustrated querying device, the querying device may embody and/or access a database for storing records, each record comprising data elements including first and second random numbers as well as a corresponding response of the PUF circuit. As will be discussed in more detail below, the data elements may be stored in various forms to enhance security benefits outlined above. Moreover, one of ordinary skill will appreciate that, while the database of FIG. 4 is illustrated in a common tabular format with columns and rows, any of various types of database structures may be implemented within the scope of the present invention. For instance, data structures for storing relationships between the aforementioned three data elements of each group or record may be embodied within other relational and/or object-oriented databases without departing from the scope of the present invention.

Other logical components associated with the querying device may include code segments for querying, encryption, and authenticity determination functions described in more detail below. It should be noted again here that, in a preferred embodiment, all or some of these logical components or code segments may be subsumed by or embodied within the software program 26 of the querying device 14. It should also be noted that embodiments of the present invention may omit one or more of such code segments (e.g., the encryption function) without departing from the spirit of the present invention.

Turning now to the illustrated queried device, the queried device may embody and/or access a non-volatile memory space (NVM) or other memory element for storing present counter values. As will be discussed in more detail below, the counter values are preferably incremented (e.g., in increments of one (1)) within an authentication cycle and/or following completion of an authentication cycle. Moreover, one of ordinary skill will appreciate that different increments may be utilized within or across counters within the scope of the present invention.

Other logical components associated with the queried device may include hardware and/or code segments for: control logic for operation of the queried device and access to the PUF circuit; sub-challenge submission and PUF circuit response (see PUF); random number generation (see $PRNG_1$ and $PRNG_2$); performing hashing operations (see Hash); pairing off first-indexed and second-indexed random numbers (see Even/Odd Separator); incrementing counters (see $Counter_0$, $Counter_1$ and $Counter_2$); performing shuffling operations and/or determining equivalence between two values (see Stream Authentication (Bit Shuffler and FSM)); and other functions described in more detail below. It should be noted again here that, in a preferred embodiment, all or some of these logical components or code segments may be subsumed by or embodied within the software program 22 of the queried device 20. It should also be noted that embodiments of the present invention may omit one or more of such code segments without departing from the spirit of the present invention.

Exemplary Method for Authentication of a Queried Device

Figure 5A:
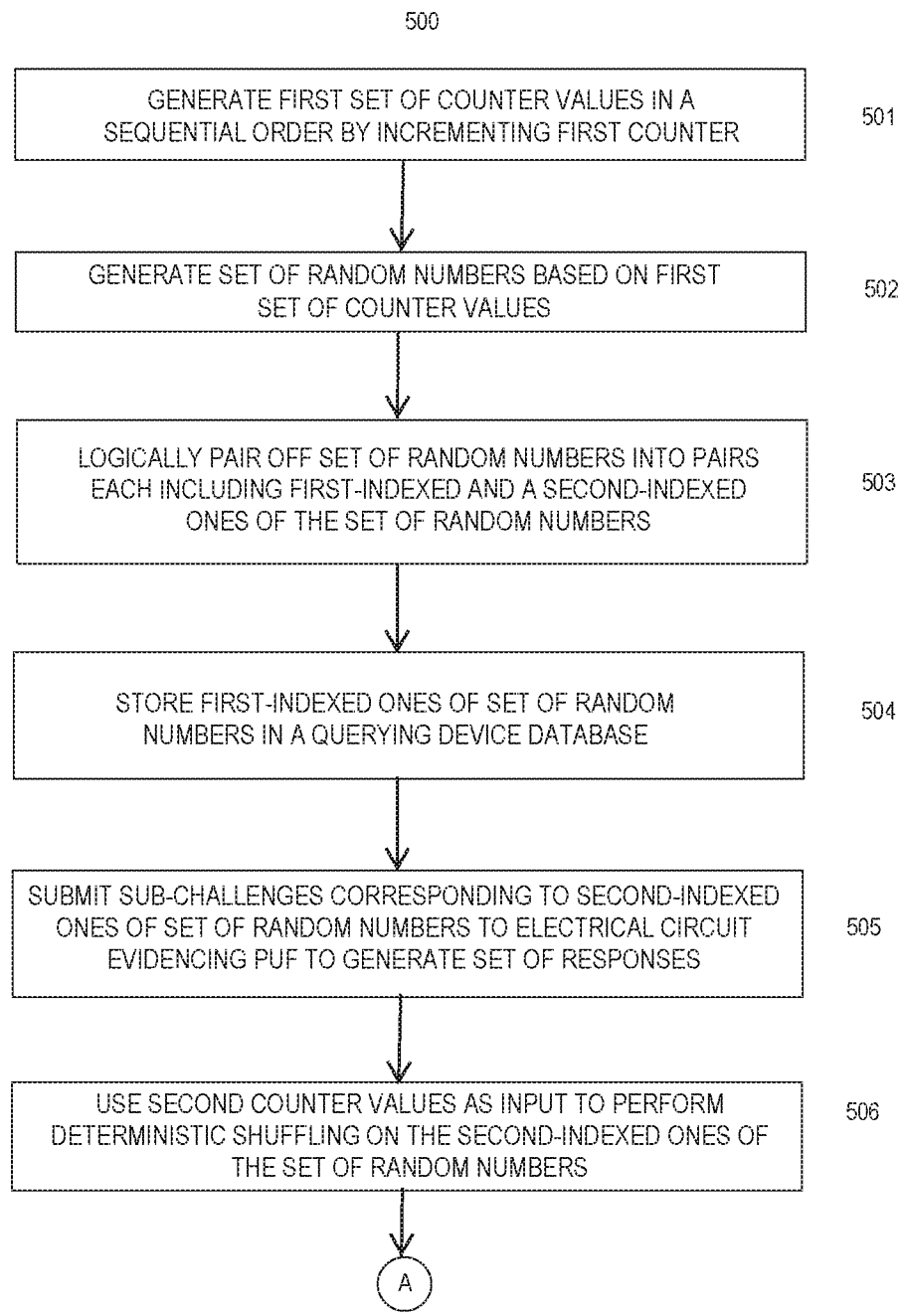
FIG. 5 illustrates at least a portion of the steps of an exemplary computer-implemented method for authenticating an electronic device exhibiting PUFs according to an embodiment of the present invention.
Figure 5B:
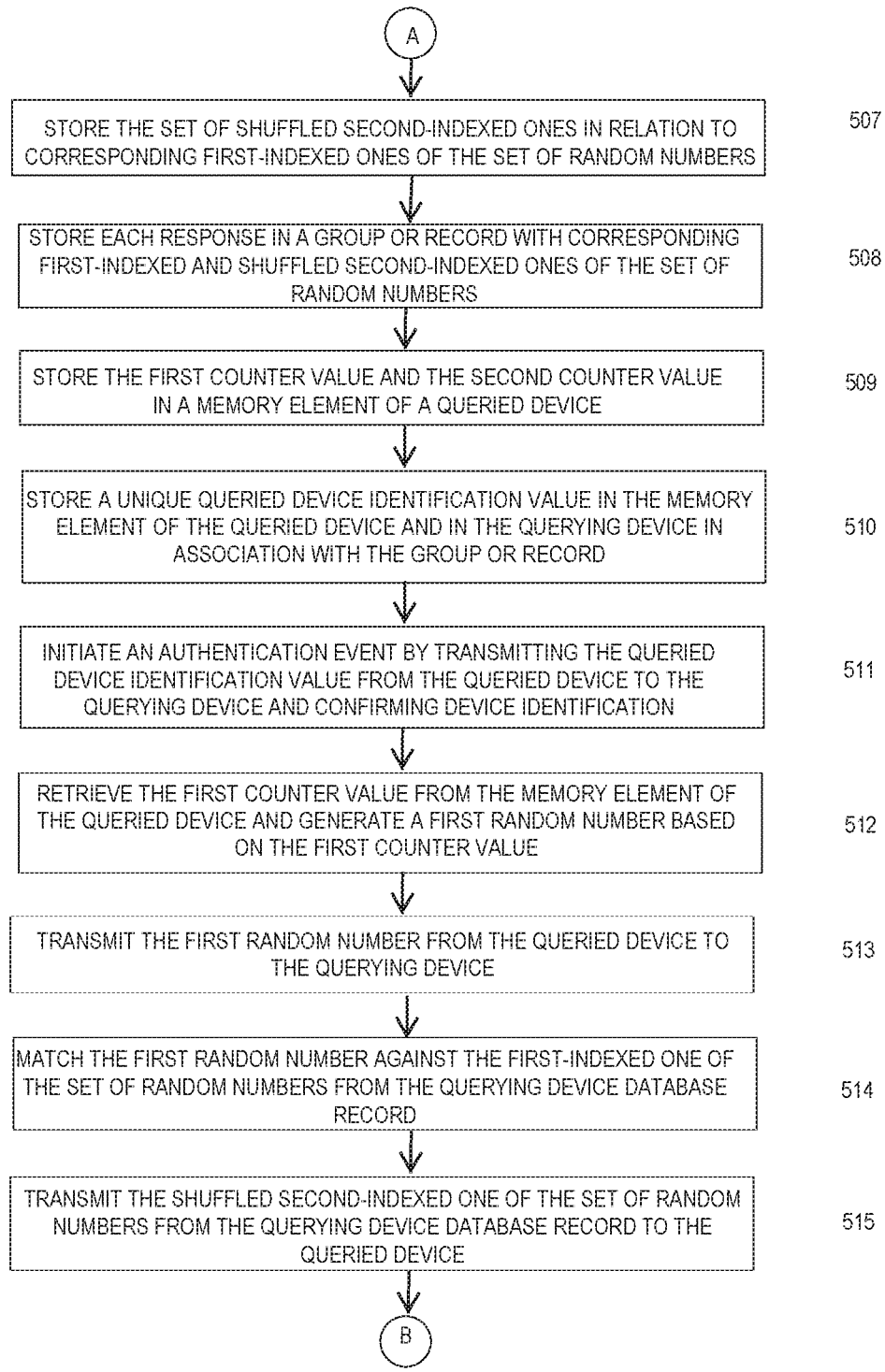
Figure 5C:
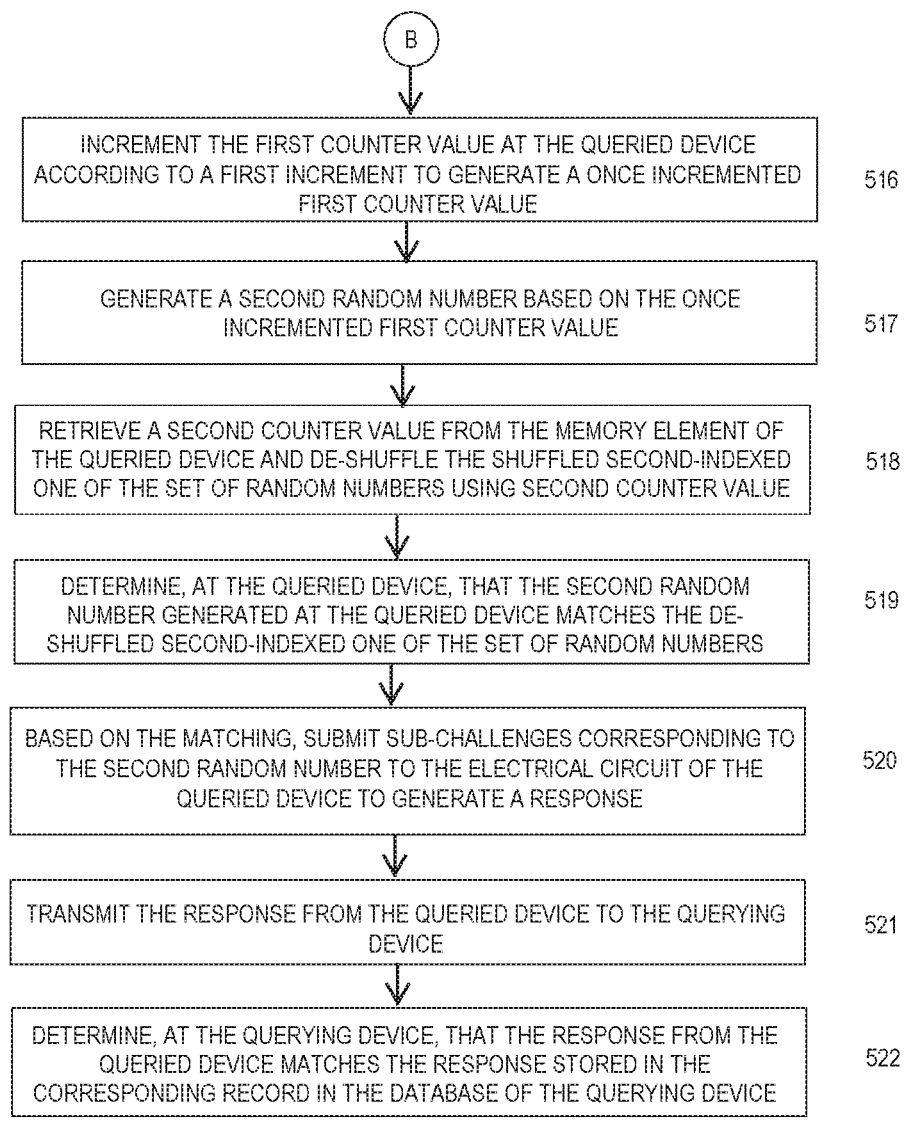

FIG. 5 depicts a listing of steps of an exemplary computer-implemented method 500 for enrolling and authenticating a queried device. Some steps may be performed concurrently as opposed to sequentially, and may in some cases be performed in a different order. In addition, some steps may be optional. The computer-implemented method 500 is described below, for ease of reference, as being executed by exemplary devices and components introduced with the embodiments illustrated in FIGS. 1-4. For example, the steps of the computer-implemented method 500 may be performed by the querying device 14, and at least in part by the queried devices 20, and/or communication links 12 through the utilization of processors, transceivers, hardware, software (such as the software applications 22, 26 described herein), firmware, or combinations thereof. However, a person having ordinary skill will appreciate that responsibility for all or some of such actions may be distributed differently among such devices or other computing devices without departing from the spirit of the present invention.

One or more computer-readable medium(s) may also be provided. The computer-readable medium(s) may include one or more executable programs, such as a queried device program and a querying device program, stored thereon, wherein the program(s) instruct one or more processing elements to perform all or certain of the steps outlined herein. The program(s) stored on the computer-readable medium(s) may instruct the processing element(s) to perform additional, fewer, or alternative actions, including those discussed elsewhere herein.

Enrollment

Referring to step 501 of FIG. 5A, a set of first counter values may be generated by incrementing a first counter. The set of first counter values may be arranged in a sequential order. The incrementing of the first counter to generate the set of first counter values may be performed by the querying device 14 and/or the queried device 20 respectively according to instructions of the programs 26, 22. The set of first counter values may be at least temporarily stored on the memory element 38 of the querying device 14 until generation of the set of random numbers discussed below. An initial one of the set of first counter values may be at least temporarily stored on the memory element 38. (See also step 509 below)

In an embodiment, the initial first counter value is a number inputted by an administrator or operator. In alternative embodiments, the initial first counter value may be generated by a random or pseudo-random number generator or by other means.

In a specific, simplified example for ease of illustration, consider an initial value of the first counter (Counter$_0$) having a decimal value of forty-four (44). Note that, in this example, each of the set of first counter values is eight (8) bits long in binary.

Starting from 44, seven (7) increments may be performed to generate a set of eight (8) first counter values {44, 45, 46, 47, 48, 49, 50, 51}. It should be noted that the number of counter values generated directly impacts the total number of responses that are ultimately stored and, correspondingly, the total number of authentication cycles that may be performed based on the enrollment processes outlined herein. Therefore, the sets of 8 counter values and random numbers outlined in the example set forth herein are non-limiting and merely by way of example, it being understood that often queried devices are enrolled with tens of thousands of challenge/response pairs at a time to ensure the availability of many authentication cycles before the need for re-enrollment arises.

It should also be noted that increments other than 1 may be utilized. One of ordinary skill will also appreciate that incrementing the first counter to generate the set of first counter values may be performed by the queried device (see Counter$_0$ of FIG. 4) and, in any case, Counter$_0$ of FIG. 4 is preferably configured to increment during the authentication process outlined in more detail below using the same increments utilized in this step 501.

Referring to step 502, a set of random numbers may be generated based on the set of first counter values. The set of random numbers may be arranged with respect to each other in the same sequential order in which the underlying, corresponding counter values of the set of first counter values were arranged. Generation of the set of random numbers may be performed by the querying device 14 according to instructions of the program 26 and/or by the queried device 20 according to instructions of the program 22. The set of random numbers may be stored on the memory element 38 in the manner(s) outlined in more detail below.

In an embodiment, the set of random numbers is generated by performing a hashing operation on each of the set of first counter values, with the hashed versions of the set of first counter values remaining in the same sequential order as the underlying values of the set of first counter values. Hashing may be performed using any hashing function or algorithm, such as secure hashing algorithms one or two (SHA-1, SHA-2) or the like, as is generally known in the art. (See also Hash component of FIG. 4)

More particularly, returning to the illustrative example outlined above, each of the set of first counter values {44, 45, 46, 47, 48, 49, 50, 51} may be hashed using secure cryptographic algorithm SHA-256 to produce a two hundred and fifty-six (256) bit output. The output may be truncated to, for example, the first or top 8 bits. For instance, the truncated version of the hashed output for the initial first counter value (44) may comprise 0x71 in hexadecimal format (or one hundred and thirteen (113) in decimal format). The set of random numbers may be generated accordingly, and may comprise {113, 129, 37, 49, 152, 14, 26, 3}. Various hashing operations may generally be utilized alone or in combination with one or more truncation operations of various length(s) to generate the set of random numbers within the scope of the present invention.

Referring to step 503, the set of random numbers may be logically paired off according to first-indexed and second-indexed ones of the set of random numbers. That is, in an embodiment, working from the sequential order of the set of random numbers preserved according to the foregoing description, a logical pairing operation may designate pairs comprising first-indexed and second-indexed ones of the set of random numbers. The pairing operation may be performed by the querying device 14 according to instructions of the program 26 and/or by the queried device 20 according to instructions of the program 22. The set of random numbers may be stored on the memory element 38 in the manner(s) outlined in more detail below.

In an embodiment, the pairing operation proceeds from left to right. (See Even/Odd Separator of FIG. 4) For instance, the pairing operation may proceed from left to right by designating an initial one of the set of random numbers as an initial first-indexed one of a first pair, and the next-adjacent or second of the set of random numbers as an initial second-indexed one of the first pair. Further, the next-adjacent random number, i.e., the one on the right side of the initial second-indexed random number, may be designated as a subsequent first-indexed one of a second pair, with the random number immediately to the right of the subsequent first-indexed one of the second pair being designated the subsequent second-indexed one of the second pair. This may proceed until all of the random numbers of the set of random numbers have been paired off according to the sequential order. Returning to the illustrative example outlined above, the set of random numbers {113, 129, 37, 49, 152, 14, 26, 3} may be paired off into the following pairs {113, 129}, {37, 49}, {152, 14}, {26, 3}.

It should be noted that a pairing operation moving in any repeatable or deterministic pattern (e.g., in any direction or combination of directions) along a set of random numbers in sequential order to designate first- and second-indexed values in pairs may be utilized without departing from the scope of the present invention. One of ordinary skill will appreciate that corresponding changes to steps for generating sets of increments and counter values preferably accompany adoption of logical pairing patterns that substantially differ from the example(s) set forth herein.

Referring to step 504, the first-indexed ones of the set of random numbers may be stored in the database accessible to the querying device. In an embodiment, the first-indexed ones of the plurality of pairs (see output (RNeven= . . . of FIG. 4) from Even/Odd Separator of the queried device in FIG. 4) are stored in the database in the order in which they were paired off and/or in a manner permitting grouping according to the logical pairing operation(s). (See steps 507, 508 below) The first-indexed ones of the set of random numbers may be stored on the memory element 38 in the manner(s) outlined in more detail below. (See $n_x$ (plaintext) and $e\_n_x$ (ciphertext, as discussed below) at querying device of FIG. 4)

Returning briefly to the illustrative example outlined above, the first-indexed random numbers {113, 37, 152, 26} may be stored in the database of the memory element 38 of the querying device 14 so that 113 (or its encrypted ciphertext) is in the first column on the left in the first or topmost record, 37 (or its encrypted ciphertext) is in the first column on the left in the second record, and so on and so forth.

One of ordinary skill will appreciate, however, that in embodiments of the present invention the actual order of storage in the database is less important than the ability to populate records containing corresponding first, second and third values (see steps 507, 508 below) according to the initial logical pairings. More particularly, so long as the values within each record correspond to the logical pairings, the ordering of the records within the database may be randomized or otherwise shuffled without departing from the spirit of the present invention. One of ordinary skill will also appreciate that an object-oriented database may be equally suited to properly populating the records according to the logical pairings, as is generally known in the art.

Further, as noted above, embodiments of the present invention include encryption of the contents of the database of the querying device. (See ciphertext versions $e\_n_x$, $e\_s'_{x+1}$, $e\_h_{x+1}$ encrypted and decrypted by AES Enc/Dec code segment(s) of FIG. 4) Such encryption may be according to known methods and algorithms, such as AES-128. One of ordinary skill will appreciate that the key(s) and algorithms employed may be adapted to conform with best practices in the art for secure storage of sensitive data within the scope of the present invention. Thus, in connection with step 504, the ciphertext of the first-indexed ones of the set of random numbers may be stored in the database.

Referring to step 505, sub-challenges corresponding to the second-indexed ones of the set of random numbers may be submitted to an electrical circuit of the queried device to generate a set of responses. The electrical circuit is configured to generate output indicative of one or more physically unclonable functions (PUFs) of the queried device. (See PUF and hashed (described below) output $h'_x$ in FIG. 4) The hashed responses corresponding to each of the second-indexed ones of the set of random numbers may be stored on the memory element 38 in the manner(s) outlined in more detail below. (See $h'_x$ (hashed) and $e\_h_{x+1}$ (hashed ciphertext, as discussed below) at querying device of FIG. 4) When considering FIG. 4, it should be noted that "x" generally denotes an even-indexed value and "x+1" denotes an odd-indexed value.

One of ordinary skill will appreciate that, while certain PUFs may be more conducive to lightweight implementation, any of a variety of electrical circuits may be configured to output electrical signals indicative of PUFs such as, for instance: a delay PUF; a static random-access memory PUF; a metal resistance PUF; a bistable ring PUF; a dynamic random access memory PUF; a digital PUF; an oxide rupture PUF; a coating PUF; a quantum electronic PUF; an optical PUF; a quantum optical PUF; a magnetic PUF; or a radio frequency PUF.

In an embodiment, sub-challenges (<c> in FIG. 4) are deterministically generated from the second-indexed ones of the set of random numbers ($C=RN_{odd}$ . . . in FIG. 4) at least in part using a pseudo-random number generator (see $PRNG_2$ of FIG. 4). One of ordinary skill will appreciate that suitable sub-challenges may depend at least in part on the PUF in question and other variables of the protocol outlined herein. Moreover, it should be appreciated that any deterministic operation may be utilized, in addition or in the alternative to pseudo-random number generator(s), to arrive at the suitable sub-challenges without departing from the spirit of the present invention.

Returning to the illustrative example outlined above, the sub-challenges may be deterministically generated by seeding or inputting the second-indexed ones of the set of random numbers into a linear feedback shift register based pseudo-random number generator. For instance, where the set of second-indexed ones of the set of random numbers comprises {129, 49, 14, 3}, each of these second-indexed random numbers has an 8 bit representation in binary. The 8 bit binary representation of 129 is 10000001.

Each of the 8 bits of the binary representation of each of the second indexed random numbers may be inputted to the pseudo-random number generator to generate eight sub-challenges, with each sub-challenge being represented in 8 bits in binary. In the illustrative example, the set of 8 sub-challenges corresponding to 129, each being representable in 8 bits in binary, may be {77, 160, 89, 12, 35, 66, 5, 100}.

Each of the 8 bit sub-challenges may then be submitted to an exemplary PUF electrical circuit (e.g., an arbiter-based PUF) to produce a one (1) bit output. The 1 bit outputs corresponding to each of the second-indexed random numbers may then be combined (in a repeatable manner, such as in the order of input) to form an 8 bit response corresponding to the second-indexed random number. In the illustrative example, the string combination of 8 bit responses may yield seventy-five (75) (in decimal format). This process is repeated to generate the full set of responses (R in FIG. 4) comprising, in this example, {75, 170, 123, 53}. In an embodiment, each of the set of responses is then hashed to generate a set of hashed responses. (See $h_{x+1}$ of FIG. 4)

Referring to step 506, the second-indexed ones of the set of random numbers may be shuffled deterministically. In an embodiment, an initial second counter value may be used as an input or seed value for a deterministic, two-way shuffling operation. (See Stream Authentication Bit Shuffler and $Counter_1$ of FIG. 4) More particularly, in an embodiment an initial value of the second counter may be inputted into a pseudo-random number generator (see $PRNG_1$ and $Counter_1$ of FIG. 4) to generate a shuffling sequence. The shuffling sequence may be used to shuffle the initial second-indexed one of the set of random numbers. The second counter may be incremented to generate another shuffling sequence for shuffling the subsequent second-indexed one of the set of random numbers, and so on and so forth.

In an embodiment, the initial second counter value is a number inputted by an administrator or operator. In alternative embodiments, the initial second counter value may be generated by random or pseudo-random number generator or by other means.

Returning briefly to the illustrative example outlined above, consider an initial value for the second counter (Counter$_1$) that has a decimal value of one hundred and forty-five (145). Note that, in this example, the second counter value(s) are each 8 bits long in binary. The initial second counter value (145) may be input to the pseudo-random number generator (e.g., one based on a linear feedback shift register) to generate the shuffling sequence {7, 4, 3, 5, 3, 3, 2, 1}. The shuffling sequence may be used as input to a shuffling code segment (e.g., implementing a Fisher-Yates Shuffler or the like) to generate a shuffled version of the initial one of the second-indexed random numbers (129). In this manner, a shuffled version (see s'$_1$ in FIG. 4) of the initial second-indexed random number is generated with the decimal value of one hundred and sixty (160). The second counter (Counter$_1$) may then be incremented to generate another seed of one hundred and forty six (146) for the pseudo-random number generator (PRNG$_1$). This next seed may be used for generation of a second shuffling sequence for shuffling of the next second-indexed random number (49) of the set of random numbers to generate a shuffled version having a decimal value of sixty nine (69). This process may be repeated until each of the second-indexed ones of the set of random numbers has been shuffled to produce a set of shuffled, second-indexed random numbers {160, 69, 130, 99}.

Referring to step 507, the shuffled, second-indexed ones of the plurality of pairs may be stored in the database of the querying device in the order in which they were paired off and/or so as to preserve the logical pairing generated in connection with step 503 above. The second-indexed ones of the set of random numbers may be stored on the memory element 38 in the manner(s) outlined in more detail below. (See s'$_{x+1}$ (plaintext) and e_s'$_{x+1}$ (ciphertext, as discussed below) at querying device of FIG. 4)

In the illustrative example outlined above, the shuffled, second-indexed random numbers {160, 69, 130, 99} may be stored in the database of the memory element 38 of the querying device 14 so that 160 (or its encrypted ciphertext) is in the second or middle column in the first or topmost record, 69 (or its encrypted ciphertext) is in the second or middle column in the second record, and so on and so forth. One of ordinary skill will appreciate, however, that in embodiments of the present invention the actual order of storage in the database is less important than the ability to populate records containing corresponding first, second and third values according to initial, logical pairing. More particularly, so long as the values within each record are consistent with the logical pairing, the ordering of the records within the database may be randomized or otherwise shuffled without departing from the spirit of the present invention. One of ordinary skill will also appreciate that an object-oriented database may be equally suited to properly populating the records according to the logical pairing, as is generally known in the art.

Further, as noted above, embodiments of the present invention include encryption of the contents of the database of the querying device. (See ciphertext versions e_n$_x$, e_s'$_{x+1}$, e_hx+1 encrypted and decrypted by AES Enc/Dec code segment(s) of FIG. 4) Thus, in connection with step 507, the ciphertext of the shuffled, second-indexed ones of the plurality of pairs may be stored in the database.

Referring to step 508, the set of responses may be stored in the database of the querying device in the order in which they were generated based on the second-indexed random numbers (i.e., reflecting the sequential order) and/or so as to preserve the logical pairings generated in connection with step 503 above. The set of responses may be stored on the memory element 38. (See h$_{x+1}$ (plaintext) and e_h$_{x+1}$ (ciphertext, as discussed below) at querying device of FIG. 4)

In the illustrative example outlined above, the set of responses {75, 170, 123, 53} may be stored in the database of the memory element 38 of the querying device 14 so that 75 (or its hashed and possibly encrypted analog) is in the third or right column in the first or topmost record, 170 (or its hashed and possibly encrypted analog) is in the third or right column in the second record, and so on and so forth. One of ordinary skill will appreciate, however, that in embodiments of the present invention the actual order of storage in the database is less important than the ability to populate records containing corresponding first, second and third values according to the initial logical pairing. More particularly, so long as the values within each record are consistent with the logical pairing, the ordering of the records within the database may be randomized or otherwise shuffled without departing from the spirit of the present invention. One of ordinary skill will also appreciate that an object-oriented database may be equally suited to properly populating the records according to the logical pairing, as is generally known in the art.

One of ordinary skill will still further appreciate that conversion between, binary, hexadecimal, decimal format and/or other formats is typically for ease of reference and explanation, and may be optional wherever described herein (provided consistency be maintained where necessary throughout the embodiment of the protocol in question).

Further, as noted above, embodiments of the present invention include encryption of the contents of the database of the querying device. (See ciphertext versions e_n$_x$, e_s'$_{x+1}$, e_hx+1 encrypted and decrypted by AES Enc/Dec code segment(s) of FIG. 4) Thus, in connection with step 508, the ciphertext of the set of hashed responses may be stored in the database.

Referring to step 509, the initial value for the first counter and the initial value for the second counter may be stored in the queried device. In the illustrative example outlined above, the initial value 44 for the first counter (Counter$_0$) and the initial value 145 for the second counter (Counter$_1$) may be stored in the queried device's non-volatile memory (see FIG. 4; see also the memory element 48 of the queried device 20). In an embodiment, these initial counter values are not also stored in the querying device as a means for further reducing the value of the information stored at the querying device in the event of breach. Moreover, the pseudo-random number generator(s), indexing or pairing off code segment(s), hashing code segment(s), counter increment definition(s), and/or shuffler(s) outlined herein are preferably defined only within the queried device(s), providing yet further insulation from risk in the event of a breach of the querying device.

Referring now to step 510, a unique queried device identification value may be generated and/or stored at the queried and querying devices. In an embodiment, the queried device identification value may comprise a unique alphanumeric string or other symbol or group of symbols capable of distinguishing the queried device from other queried device(s) at the desired level of abstraction, individual and/or group identity.

One of ordinary skill will appreciate that a different method for identifying a queried device, or no method at all, may be employed without departing from the spirit of the present invention.

One of ordinary skill will also appreciate that the enrollment process outlined herein preferably occurs in a trusted environment in which communications along communication links are considered secure from interception. The following description of an authentication event, however, may occur in an environment in which it is expected that at least the querying device may be subject to breach and/or that the communications between querying and queried device(s) may be intercepted.

Authentication

Referring to step 511, an authentication event may be initiated following enrollment by transmission of the queried device identification value from the queried device to the querying device to confirm identification of the queried device.

In an embodiment—such as where the queried device comprises an RFID tag or the like—the queried device may be prompted to transmit the identification value by the querying device based on proximity. In another embodiment—such as where the queried device is seeking data from the querying device or a device protected by the querying device—the communication may be initiated by the queried device as a means of beginning the process of retrieving such data. One of ordinary skill will appreciate that a wide variety of events could trigger an authentication event or cycle within the scope of the present invention.

Upon receipt of the identification value from the queried device, the querying device may check the identification value against its internal database and identify and/or retrieve records corresponding to the identification value for use in an authentication cycle outlined below. If no matching identification value is found in its internal database, the querying device may transmit a notification that attempted authentication is declined and/or may halt all processing of transmission(s) from the queried device. If a matching identification value is found in the querying device database, the querying device may transmit a corresponding notification to the queried device to proceed with the authentication cycle.

Figure 2:
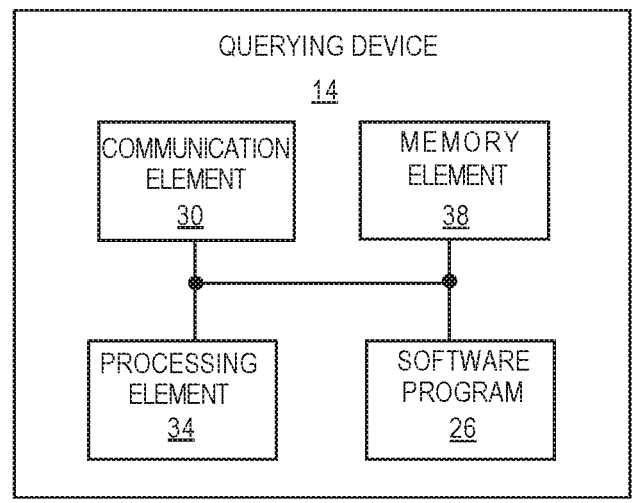
FIGS. 2 and 3 illustrate various components of exemplary querying and queried devices shown in block schematic form that may be used with the system of FIG. 1.

The aforementioned steps for matching of the identification value may be respectively performed by the components of the queried device 20 (see FIG. 3) and of the querying device 14 (see FIG. 2).

Referring to step 512, the initial first counter value may be retrieved from the memory element of the queried device and used to generate a first random number. In an embodiment, this step 512 is a repeat of step 502 described above with respect to generation of the first random number, and is performed by the components of the queried device 20 (see FIG. 3).

In the illustrative embodiment outlined above, the value 44 for Counter$_0$ may be retrieved and hashed. The hashed version of 44 may then be truncated and the truncated remainder may be converted to a decimal format to arrive at the first random number (113). (See also the no instance of input $n_x$ to the querying device of FIG. 4)

Referring to step 513, the first random number generated by the queried device during authentication may be transmitted to and received by the querying device. In an embodiment, this step 513 is performed by the components of the queried device 20 and of the querying device 14 (see FIGS. 2, 3).

In the illustrative embodiment outlined above, the first random number is 113.

Referring to step 514, the querying device may match the first random number received from the queried device during authentication against the values in the first column of database records. In an embodiment, the querying device may search only values in the first column of records corresponding to the identification value of the queried device in question when performing this step. In an embodiment, this step 514 is performed by the components of the querying device 14 (see FIG. 2).

As noted in connection with prior steps, embodiments of the present invention utilize encryption to secure the contents of the database of the querying device. In such embodiments, the querying device may encrypt the first random number received from the queried device during authentication, using the same or consistent encryption algorithm and key that was used during the enrollment process, before matching against the values in the first column of the database records in connection with step 514.

Moreover, upon matching a record (e.g., the first record discussed above in connection with enrollment in this first authentication cycle), the querying device may retrieve the value in the second column of the matched record (i.e., $s'_{x+1}$ or $e\_s'_{x+1}$ in FIG. 4). In the illustrated example outlined above, this second column value is the initial shuffled, second-indexed one of the set of random numbers ($s'_1$ from FIG. 4), with a value of 160.

Further, in embodiments employing encryption to secure the querying device database contents, the querying device may decrypt the value in the second column of the matching record retrieved in connection with this step, using the same or consistent encryption algorithm and key that was used during the enrollment process.

Referring to step 515, the plaintext shuffled, second-indexed one of the set of random numbers retrieved from the matching record according to step 514 may be transmitted to and received by the queried device. In an embodiment, this step 515 is performed by the components of the queried device 20 and of the querying device 14 (see FIGS. 2, 3).

Referring to step 516, the queried device may increment the first counter once according to a first increment to generate a once incremented first counter value. It should be noted here that the first increment equals a first increment of the set of increments performed by the first counter described above in connection with step 501. In an embodiment, this step 516 is performed by the components of the queried device 20 (see FIG. 3). Moreover, in the illustrative example outlined above, the once incremented first counter value equals forty-five (45).

Referring to step 517, the queried device may generate a second random number based on the once incremented first counter value. In an embodiment, the process for generation of the second random number is substantially identical to that for generating the first random number in step 512 above, except based on the once incremented first counter value. In an embodiment, this step 516 is performed by the components of the queried device 20 (see FIG. 3).

In the illustrative example outlined above, the second random number generated by the queried device during authentication equals 129.

Referring to step 518, the initial second counter value may be retrieved from the memory element of the queried device and used to de-shuffle the shuffled, second-indexed one of the set of random numbers retrieved from the matching record. In an embodiment, this step 518 is a reverse of step 506 described above with respect to shuffling the initial second-indexed one of the set of random numbers, and is performed by the components of the queried device 20. (See FIG. 3)

In the illustrative embodiment outlined above, the initial second counter value (145) may be input into the pseudo-random number generator (e.g., PRNG$_1$ of FIG. 4, based on a linear feedback shift register) to generate the shuffling sequence {7, 4, 3, 5, 3, 3, 2, 1}, as above in step 506. The shuffling sequence may be used as input to a de-shuffling code segment (e.g., implementing a Fisher-Yates Shuffler or the like). The de-shuffling code segment may, for example, perform the Fisher-Yates shuffle in a reverse direction (i.e., right to left) to generate a de-shuffled version of the initial one of the second-indexed random numbers (129) from the shuffled version (160). One of ordinary skill will appreciate that the process outlined above is merely exemplary with respect to the illustrative embodiment, and may be modified by one of ordinary skill to accommodate variations thereon within the scope of the present invention.

Referring to step 519, the second random number generated at the queried device during authentication is matched against the de-shuffled, second-indexed one of the set of random numbers retrieved at the querying device from the matching record. In an embodiment, this step 519 is performed by the components of the queried device 20 (see FIG. 3).

In the illustrative example outlined above, the second random number generated by the queried device during authentication, and the de-shuffled, second-indexed one of the set of random numbers retrieved by the querying device from the matching record, each equal 129. In embodiments where the matching or comparison according to this step 519 is performed by a finite-state machine comprising and/or forming a part of the processing element 52 of the queried device 20, the match will result in traversal of the states of the finite-state machine to unlock or permit access, according to the control logic of the device 20, for submission of sub-challenges to the PUF electrical circuit. If, on the other hand, matching is unsuccessful, the states of the finite-state machine may not be traversed and access to the PUF electrical circuit may be denied.

Further, an embodiment utilizing a finite-state machine may implement a checking mechanism to monitor unsuccessful attempts to unlock the PUF electrical circuit. More particularly, in an embodiment, the second random number generated by the queried device during authentication and the de-shuffled, second-indexed one of the set of random numbers retrieved from the matching record (together, referred to herein as the "finite-state input values") may be broken down into k-bit tuples and used as state transitions for the finite-state machine. The finite-state machine traverses through the $m^{th}$ state if the $m^{th}$ k-bit tuple of the finite-state input values are equal. The state-traversal in the finite-state machine continues through a plurality of states until it reaches the last state, or the "output enable state," which only occurs when the finite-state input values are equal. A flag value is utilized in connection with each state of the plurality of states, so that whenever a state is not successfully traversed (i.e., all flag values are not equal to the successful traversal flag value, such as "1") the output enable state is not reached.

Moreover, in the preferred embodiment, the control logic of the queried device includes a lockout counter. That is, a third counter (see Counter$_2$ of FIG. 4) may be incremented each time an input fails to lead to the output enable state and/or each time a flag value for one or more of the plurality of states of the finite-state machine does not have the value corresponding to successful traversal. The control logic may perform a check of the present value for the third counter before, during or after each authentication event, or on some other interval or in connection with another triggering event, to determine whether the present value of the third counter meets or exceeds a threshold. If the present value of the third counter meets or exceeds the threshold, the queried device may automatically lock to prevent further attempts to access the PUF electrical circuit unless and until unlocked by the querying device or other means.

It should also be noted that each unsuccessful traversal of the plurality of states that does not exceed the threshold may also be followed by a reset of the software program or control logic (e.g., the software program 22) to prepare for a new authentication cycle in addition to incrementing of the third counter.

Referring to step 520, sub-challenges corresponding to the second random number generated by the queried device may be submitted to the PUF electrical circuit of the queried device to generate a response. In an embodiment, this step 520 is a repeat of step 505 described above with respect to generation and submission of the sub-challenges in connection with the second random number, and is performed by the components of the queried device 20 (see FIG. 3). More particularly, with reference to the illustrative example outlined above, the binary representation (10000001) of the second random number (129) may be submitted bit-by-bit to the pseudo-random number generator (see PRNG$_2$ of FIG. 4) to generate the set of sub-challenges comprising {77, 160, 89, 12, 35, 66, 5, 100}. These sub-challenges may be submitted, as described in more detail above in connection with step 505, to the PUF electrical circuit of the queried device to generate the response of 75 (in decimal format).

In addition, preferred embodiments of the present invention may incorporate self-checking mechanism(s) to account for inaccuracies that could derive from post-enrollment changes in the PUF electrical circuit and/or environmental factors impacting generation of responses by the PUF electrical circuit. For instance, differences in temperature, humidity or the like may contribute to generation of noisy responses by arbiter PUF electrical circuits.

Exemplary self-checking mechanism(s) or code segment(s) may be implemented according to and/or as part of the control logic or software program of the queried device. Self-checking code may be implemented as part of the process for generating a response during authentication, e.g., in connection with step 520. More particularly, each sub-challenge may be submitted to the PUF electrical circuit a plurality of times during an authentication event, with the most commonly-occurring output being chosen as the actual output for the sub-challenge (i.e., "majority voting"). The winning bits of output from the PUF electrical circuit may be combined to form the final response string.

Also, in preferred embodiments, the queried device may perform dynamic reliability checking as part of the process for generating a response during authentication, e.g., in connection with step 520. Because the queried device preferably controls the generation of sub-challenges to the PUF electrical circuit, as described in detail herein, it is possible to perform dynamic reliability checking unilaterally and without permission from the querying device. More particularly, the queried device may evaluate the degree of disagreement between the outputs from each sub-challenge to determine whether an authentication cycle based on sub-challenges from a particular second-indexed random number should be allowed to proceed. For example, the queried device may evaluate whether minority output values from submission of the same sub-challenge a plurality of times (i.e., the "majority voting" process outlined above) exceed a threshold frequency (e.g., whether forty percent (40%) or more of the outputs are of the minority value). If the threshold is exceeded, the response outputs may be presumed unreliable, and the queried device may increment the first and second counters and restart the authentication cycle.

Referring to step 521, the response of the PUF electrical circuit generated by the queried device during authentication may be transmitted to and received by the querying device. In an embodiment, this step 521 is performed by the components of the queried device 20 and of the querying device 14 (see FIGS. 2, 3).

In the illustrative embodiment outlined above, the response is 75.

Referring to step 522, the querying device may determine that the response from the PUF electrical circuit of the queried device matches the value in the third column of the matched record (i.e., $h_{x+1}$ or $e\_h'_{x+1}$ in FIG. 4). In an embodiment, this step 522 is performed by the components of the querying device 14 (see FIG. 2).

Further, in embodiments employing encryption to secure the querying device database contents, the querying device may decrypt the value in the third column of the matching record retrieved in connection with step 514, using the same or consistent encryption algorithm and key that was used during the enrollment process, prior to making the matching determination of step 522.

In a preferred embodiment, the queried device will complete the authentication cycle by incrementing the values of $Counter_0$ and $Counter_1$ stored in the queried device memory element in preparation for the next authentication cycle.

Successful matching according to step 522 outlined above authenticates the queried device to the querying device. In an embodiment, completion of the authentication cycle leads directly to a permitted act authorized by the querying device. For instance, the querying device may, based upon completed authentication, signal proper authentication to an actuator that unlocks a door, provide access to a database to the queried device, transmit a request received from the queried device to another computing device as an authenticated message, or otherwise act in favor of the queried device as a result of the proper authentication. One of ordinary skill will appreciate that such a permitted act may be a single action (such as unlocking a door), may comprise permitting access for a limited period of time (such as where access to a database is provided for a limited period of time) or may be otherwise configured within the scope of the present invention.

ADDITIONAL CONSIDERATIONS

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

We claim:

1. A system for device authentication enrollment, comprising:
   a queried electronic device including a queried memory element and an electrical circuit configured to output electrical signals indicative of a physically unclonable function of the queried electronic device; and
   non-transitory computer-readable media having computer-readable instructions instructing completion of the following steps by at least one processing element—
      increment a first counter according to a first set of increments to generate a set of first counter values including a first counter value, the set of first counter values being in a sequential order,
      generate a set of random numbers at least in part by performing a hashing operation on each of the set of first counter values, whereby the set of random numbers is ordered to preserve the sequential order,
      logically pair off the set of random numbers to generate a plurality of pairs, each of the plurality of pairs comprising a first-indexed one of the set of random numbers and a second-indexed one of the set of random numbers,
      store the first-indexed ones of the set of random numbers in a database,
      submit sub-challenges respectively corresponding to the second-indexed ones of the set of random numbers to the electrical circuit to generate a set of responses,
      perform, using a set of second counter values including an initial second counter value as input, a deterministic shuffling operation on the second-indexed ones of the set of random numbers to generate a set of shuffled second-indexed ones of the set of random numbers,
      store the set of shuffled second-indexed ones of the set of random numbers in the database, the set of shuffled second-indexed ones of the set of random numbers being stored respectively in relation to corresponding first-indexed ones of the set of random numbers to preserve the logical pairing of the plurality of pairs,
      store each of the responses of the set of responses in the database so as to form a group or record with a corresponding first-indexed one of the set of random numbers and a corresponding shuffled second-indexed one of the set of random numbers,
      store the initial first counter value and the initial second counter value in the queried memory element.

2. The system for device authentication enrollment of claim 1, wherein the computer-readable instructions further instruct the at least one processing element to:

perform a hashing operation on each one of the set of responses prior to storing the set of responses in the database.

3. The system for device authentication enrollment of claim 2, wherein the computer-readable instructions further instruct the at least one processing element to:
perform an encryption operation on each one of the hashed set of responses prior to storing the set of responses in the database,
perform an encryption operation on each of the first-indexed ones of the set of random numbers prior to storing the first-indexed ones of the set of random numbers in the database.

4. The system for device authentication enrollment of claim 1, wherein the computer-readable instructions further instruct the at least one processing element to:
store a unique queried device identification value in the database,
store the queried device identification value in the queried memory element.

5. The system for device authentication enrollment of claim 1, wherein the electrical circuit is configured to output electrical signals indicative of a physically unclonable function (PUF) of the queried electronic device that includes at least one of: a delay PUF; a static random-access memory PUF; a metal resistance PUF; a bistable ring PUF; a dynamic random access memory PUF; a digital PUF; an oxide rupture PUF; a coating PUF; a quantum electronic PUF; an optical PUF; a quantum optical PUF; a magnetic PUF; or a radio frequency PUF.

6. The system for device authentication enrollment of claim 1, wherein the logical pairing is performed on the set of random numbers in the sequential order at least in part by—
identifying a first and a second of the set of random numbers respectively as initial first-indexed and second-indexed ones of the set of random numbers, the initial first-indexed and second-indexed ones of the set of random numbers comprising an initial pair of the plurality of pairs,
identifying a subsequent first-indexed one of the set of random numbers adjacent the initial second-indexed one of the set of random numbers in the sequential order,
identifying a subsequent second-indexed one of the set of random numbers adjacent the subsequent first-indexed one of the set of random numbers, the subsequent first-indexed and the subsequent second-indexed ones of the set of random numbers comprising a subsequent pair of the plurality of pairs.

7. The system for device authentication enrollment of claim 1, wherein each increment of the first set of increments is one (1).

8. The system for device authentication enrollment of claim 1, wherein generating the set of random numbers at least in part by performing the hashing operation on each of the set of first counter values further includes truncating each hashed one of the set of first counter values and converting the truncated, hashed one of the set of first counter values to a decimal format.

9. The system for device authentication enrollment of claim 1, wherein—
the computer-readable instructions further instruct the at least one processing element to generate the sub-challenges at least in part by submitting bits of a binary representation of each of the second-indexed ones of the set of random numbers to a pseudorandom bit generator,
each of the sub-challenges is submitted to the electrical circuit to produce a corresponding one (1) bit output,
the one (1) bit outputs corresponding to each of the second-indexed ones of the set of random numbers are combined to generate a corresponding one of the set of responses.

10. The system for device authentication enrollment of claim 9, wherein the pseudorandom bit generator comprises a linear-feedback shift register.

11. A computer-implemented method for authentication of a queried device having a queried memory element, a queried processing element, a queried communication element, and an electrical circuit configured to output electrical signals indicative of a physically unclonable function of the queried device, the method comprising:
retrieving, via the queried processing element, a first value from the queried memory element;
generating, via the queried processing element, a first random number based on the first value at least in part by performing a hashing operation on the first value;
transmitting, via the queried communication element, the first random number to a querying device, the querying device having a querying communication element, a querying memory element and a querying processing element;
matching, via the querying processing element, the first random number against a first value of a record, the record being stored in a database of the querying memory element and also corresponding to second and third values;
transmitting, via the querying communication element and the queried communication element, the second value corresponding to the record to the queried device;
incrementing, via the queried processing element, the first value according to a first increment to generate a once incremented first value;
generating, via the queried processing element, a second random number at least in part by performing a hashing operation on the once incremented first value;
retrieving, via the queried processing element, a second value from the queried memory element;
performing, via the queried processing element and based on the second value, a deterministic de-shuffling operation on the second value of the record received from the querying device to generate a de-shuffled second value of the record;
determining, via the queried processing element, that the second random number generated by the queried device matches the de-shuffled second value of the record;
submitting, based on the matching determination and via the queried processing element, sub-challenges corresponding to the second random number to the electrical circuit to generate a response;
transmitting, via the querying communication element and the queried communication element, the response to the querying device; and
determining, via the querying processing element, that the response generated by the queried device matches the third value of the record to complete a first authentication of the queried device.

12. The computer-implemented method of claim 11, wherein generating the first random number at least in part by performing the hashing operation on the first value further includes truncating the hashed first value and converting the truncated, hashed first value to a decimal format.

13. The computer-implemented method of claim 12, wherein the first value and the second value of the record are stored in an encrypted format based on a key, further comprising—
performing an encryption operation, via the querying processing element and using the key, on the first random number following receipt from the queried device to enable the matching against the first value of the record,
performing a decryption operation, via the querying processing element and using the key, on the second value of the record based on the matching of the first random number to the first value of the record and prior to transmitting the second value to the queried device.

14. The computer-implemented method of claim 13, further comprising—
generating the sub-challenges, via the queried processing element, at least in part by submitting bits of a binary representation of the second random number to a pseudorandom bit generator,
wherein each of the sub-challenges is submitted to the electrical circuit to produce a corresponding one (1) bit output, and the one (1) bit outputs corresponding to the second random number are combined to at least in part generate the response.

15. The computer-implemented method of claim 14, wherein generation of the response further includes hashing the combined outputs corresponding to the second random number.

16. The computer-implemented method of claim 15, wherein the third value of the record is stored in encrypted format based on the key, further comprising performing a decryption operation, via the querying processing element and using the key, on the third value to enable the determination that the response matches the third value of the record.

17. The computer-implemented method of claim 11, wherein the deterministic de-shuffling operation based on the second value includes—
submitting bits of a binary representation of the second value to a deterministic pseudorandom number generator to generate a sequence of numbers,
using the sequence of numbers to deterministically generate the de-shuffled second value of the record.

18. The computer-implemented method of claim 11, further comprising—
retrieving, via the queried processing element, a unique queried device identification value from the queried memory element,
transmitting, via the queried communication element and the querying communication element, the unique queried device identification value to the querying device,
comparing the unique queried device identification value against a matching value corresponding to an area of the database exclusively associated with the queried device, the area of the database containing the record.

19. The computer-implemented method of claim 11, further comprising performing the following—
incrementing, via the queried processing element and in conjunction with the completion of the first authentication of the queried device, the once incremented first value according to a second increment to generate a twice incremented first value,
incrementing, via the queried processing element and in conjunction with the completion of the first authentication of the queried device, the second value to generate a once incremented second value,
storing the twice incremented first value and the once incremented second value for use in connection with a second authentication of the queried device.

20. The computer-implemented method of claim 11, wherein the electrical circuit is configured to output electrical signals indicative of a physically unclonable function (PUF) of the queried electronic device that includes at least one of: a delay PUF; a static random-access memory PUF; a metal resistance PUF; a bistable ring PUF; a dynamic random access memory PUF; a digital PUF; an oxide rupture PUF; a coating PUF; a quantum electronic PUF; an optical PUF; a quantum optical PUF; a magnetic PUF; or a radio frequency PUF.

* * * * *